Figure 1:
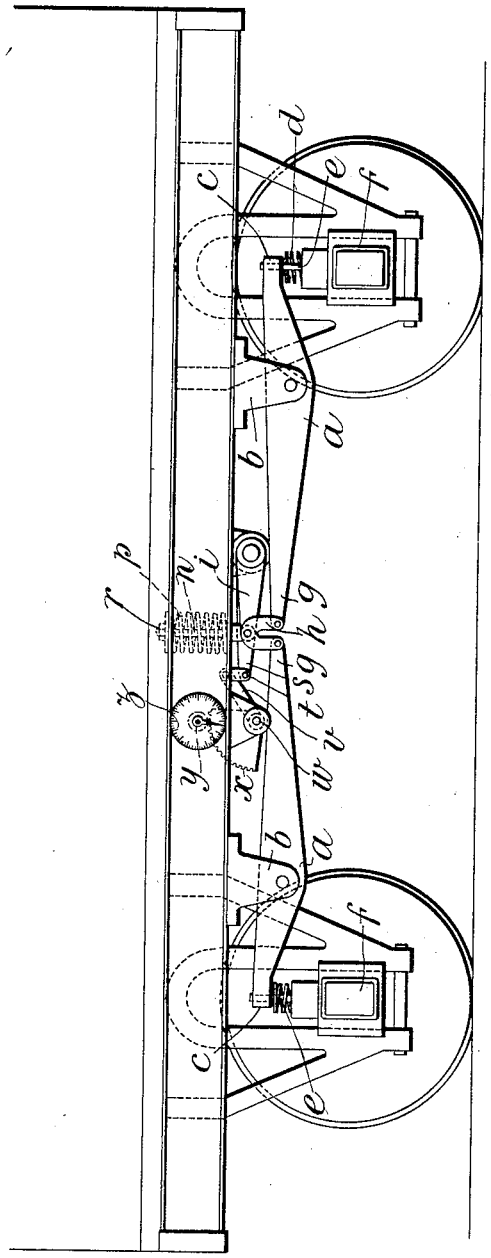

No. 746,895. PATENTED DEC. 15, 1903.
T. G. STEVENS.
WEIGHING TRUCK.
APPLICATION FILED AUG. 20, 1903.
NO MODEL. 2 SHEETS—SHEET 1.

WITNESSES. INVENTOR
Albert Jones Thomas George Stevens
Herbert N Bolwell By his Attorneys.
Wheatley & MacKenzie

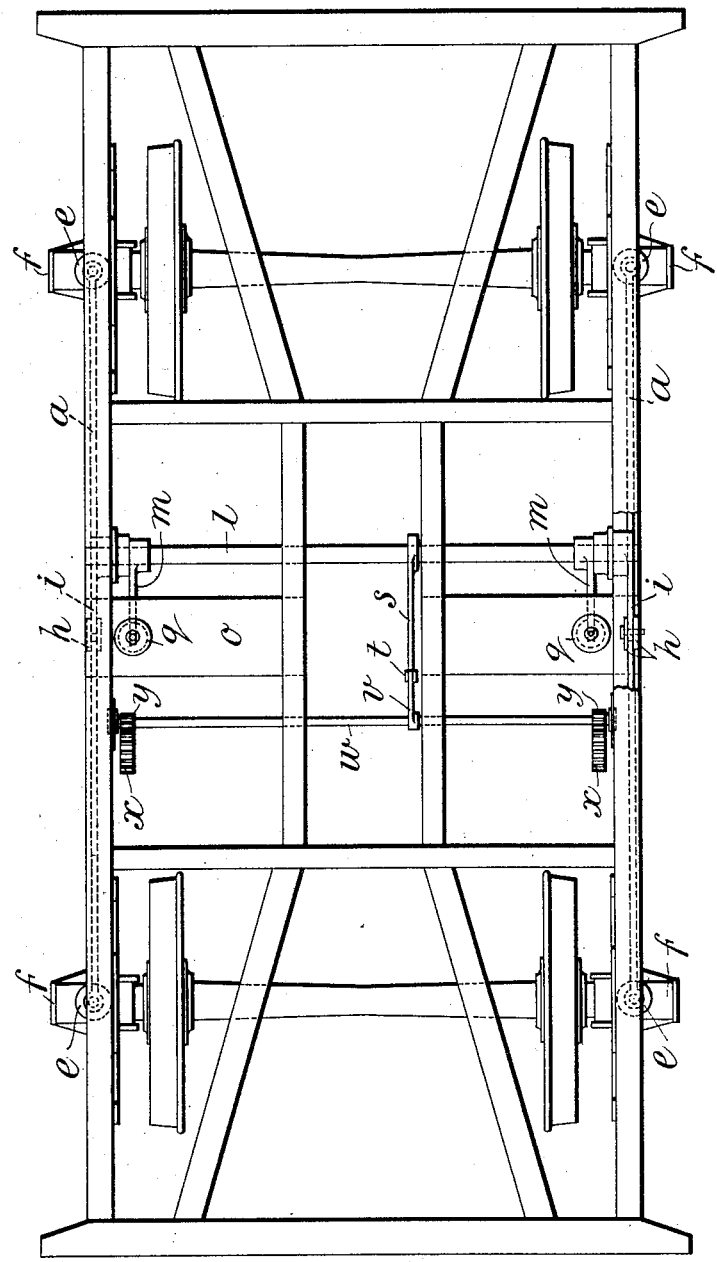

No. 746,895. Patented December 15, 1903.

UNITED STATES PATENT OFFICE.

THOMAS GEORGE STEVENS, OF GREENHITHE, ENGLAND.

WEIGHING-TRUCK.

SPECIFICATION forming part of Letters Patent No. 746,895, dated December 15, 1903.

Application filed August 20, 1903. Serial No. 170,230. (No model.)

*To all whom it may concern:*

Be it known that I, THOMAS GEORGE STEVENS, a subject of the King of Great Britain and Ireland, residing at No. 5 The Terrace, Greenhithe, in the county of Kent, England, have invented certain new and useful Improvements in Weighing-Trucks; and I do hereby declare the following to be a full, clear, and exact description of the invention, such as will enable others skilled in the art to which it appertains to make and use the same.

This invention for improvements in weighing-trucks relates more especially to railway-vehicles which are so arranged and constructed that all the supporting-springs act in unison irrespective of the manner in which the imposed load is distributed, so that on connecting the spring mechanism of the vehicle to a suitable indicating device the weight of the contents of the vehicle may be read off.

In the accompanying drawings, Figure 1 shows a side elevation of this invention as applied to a four-wheeled railway-vehicle, and Fig. 2 is a plan of the same.

In this arrangement two pairs of similar symmetrically-arranged supporting-levers $a$ are employed, fulcrumed to the brackets $b$ and having their outer arms $c$ mounted to slide on vertical guides $d$ and supported by a spring $e$, resting on the axle-box $f$. The inner arms $g$ of the levers $a$ are connected by inverted-U-shaped links $h$ with rocking levers $i$ on a rocking shaft $l$. The shaft $l$ is also provided with a pair of arms or levers $m$, each connected to a rod $n$, resiliently supported on a transverse member $o$ by the interposition of a spring $p$ between a disk $q$, secured to the rod $n$ and the said frame member. The disk $q$ is secured on the rod by a nut $r$, by which means the initial compression on the spring may be adjusted.

In order to indicate the weight of the load in the vehicle, an arm $s$ is rigidly fixed on the shaft $l$ and connected by a link $t$ with another arm $v$, fixed on a cross-shaft $w$. The shaft $w$ is mounted to rotate in suitable bearings and carries a pair of toothed sectors $x$, which gear with pinions $y$ and actuate pointers on dials $z$, fixed on the outsides of the side frame members of the vehicle, by which means the weight of the load in the vehicle can be read off.

What I claim, and desire to secure by Letters Patent, is—

1. The combination with a four-wheeled vehicle, the axle-boxes and the springs mounted on said boxes, of means for producing unison of action in said springs, comprising two pairs of coupled supporting-levers fulcrumed to the body of the vehicle, the outer end of the levers being supported on said springs, a pair of coupled rocking levers of equal length connected together by a shaft mounted in bearings secured to the underframe of the vehicle, suspending-links connecting the inner ends of the supporting-levers with the rocking levers, a second pair of rocking levers fixed on the same shaft as the first pair, and springs supporting the ends of the second pair of rocking levers, and through the connecting-shaft and first pair of levers the inner ends of the supporting-levers, substantially as described.

2. The combination with a four-wheeled vehicle, the axle-boxes and the springs mounted on said boxes, of supporting-levers having their outer ends resting upon said springs, rocking levers connected to the inner ends of the supporting-levers, a rocking shaft mounted in bearings on the underframe of the vehicle and to which shaft the rocking levers are connected, springs supporting the rocking levers, and means for indicating the weight of the load, comprising a lever fixed on the rocking shaft, a cross-shaft operated by the lever, pointers on the sides of the vehicle, and connections between the cross-shaft and the pointers.

In testimony whereof I have affixed my signature in presence of two witnesses.

THOMAS GEORGE STEVENS.

Witnesses:
H. D. JAMESON,
C. P. LIDDON.